United States Patent [19]
Carlin et al.

[11] Patent Number: 5,253,891
[45] Date of Patent: Oct. 19, 1993

[54] SAFETY INTERLOCK MECHANISM FOR AIRCRAFT GROUND POWER UNITS

[75] Inventors: John K. Carlin, Troy; Brian J. Hicks, Arcanum; Jerry L. Besecker, Covington, all of Ohio

[73] Assignee: Hobart Brothers Company, Troy, Ohio

[21] Appl. No.: 976,433

[22] Filed: Nov. 13, 1992

[51] Int. Cl.$^5$ .................. B60D 1/62; B60R 16/00
[52] U.S. Cl. ..................... 280/422; 280/446.1; 280/789; 439/35; 439/503
[58] Field of Search ............ 280/420, 422, 446.1, 280/638, 656, 789; 244/114 R; 439/34, 35, 503, 504

[56] References Cited
PUBLICATIONS

AMR proposed safety receptacle dated Aug. 5, 1990.

*Primary Examiner*—Margaret A. Focarino
*Assistant Examiner*—Victor E. Johnson
*Attorney, Agent, or Firm*—Biebel & French

[57] ABSTRACT

A safety interlock mechanism requires a trailer tow bar to be raised and placed into the mechanism before an electrical power supply cable can be removed from the mechanism and attached to an aircraft. Similarly, the electrical cable must be disconnected from the aircraft and placed into the interlock mechanism before the tow bar can be removed and placed onto a tractor for movement of the ground power unit. The safety interlock mechanism includes a hinged plate, which, in one position, prevents the removal of the electrical cable connector when the tow bar is not in place, and when in another position, prevents the removal of the tow bar when the electrical cable connector has been removed. Locking tabs engage the electrical connector whenever the tow bar has been removed. A locking pin engages a U-bolt attached to the tow bar whenever the electrical connector has been removed.

3 Claims, 5 Drawing Sheets

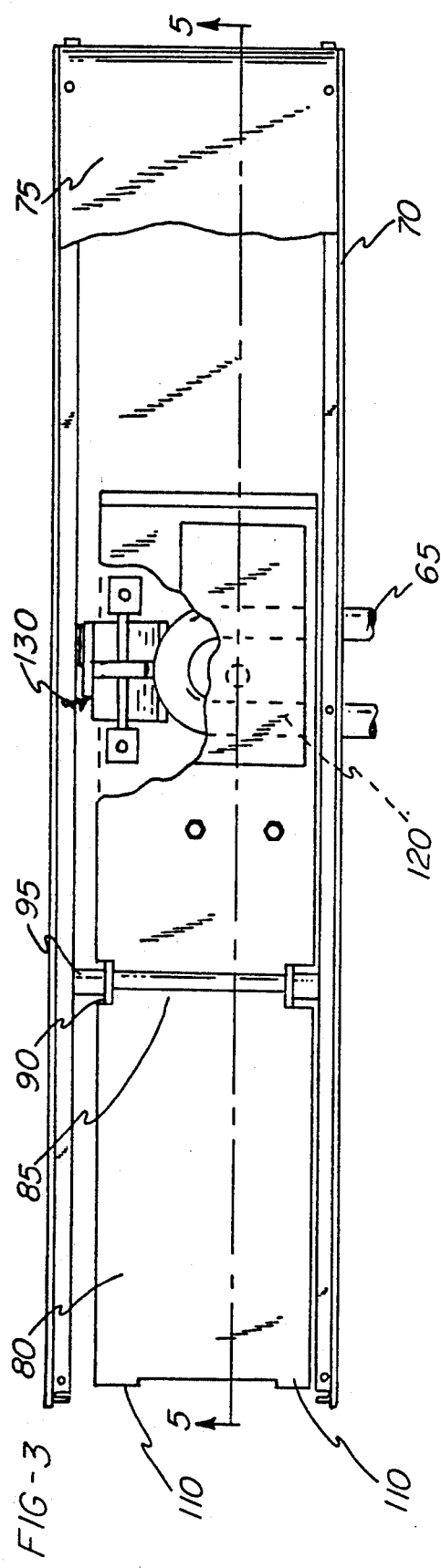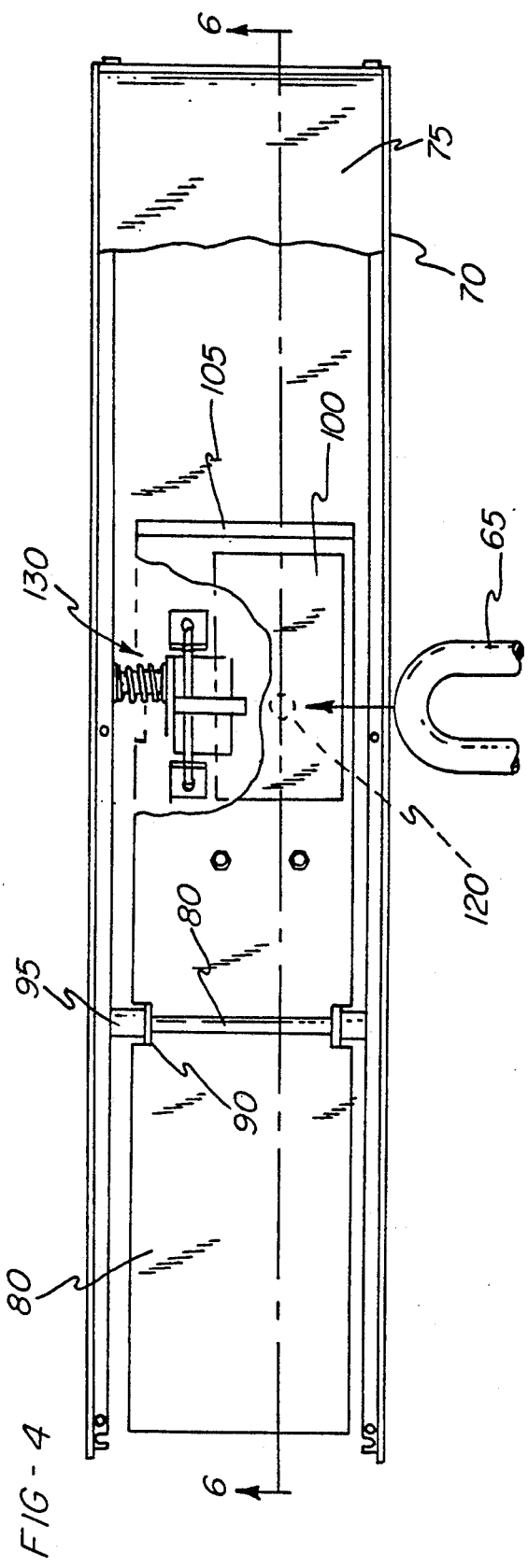

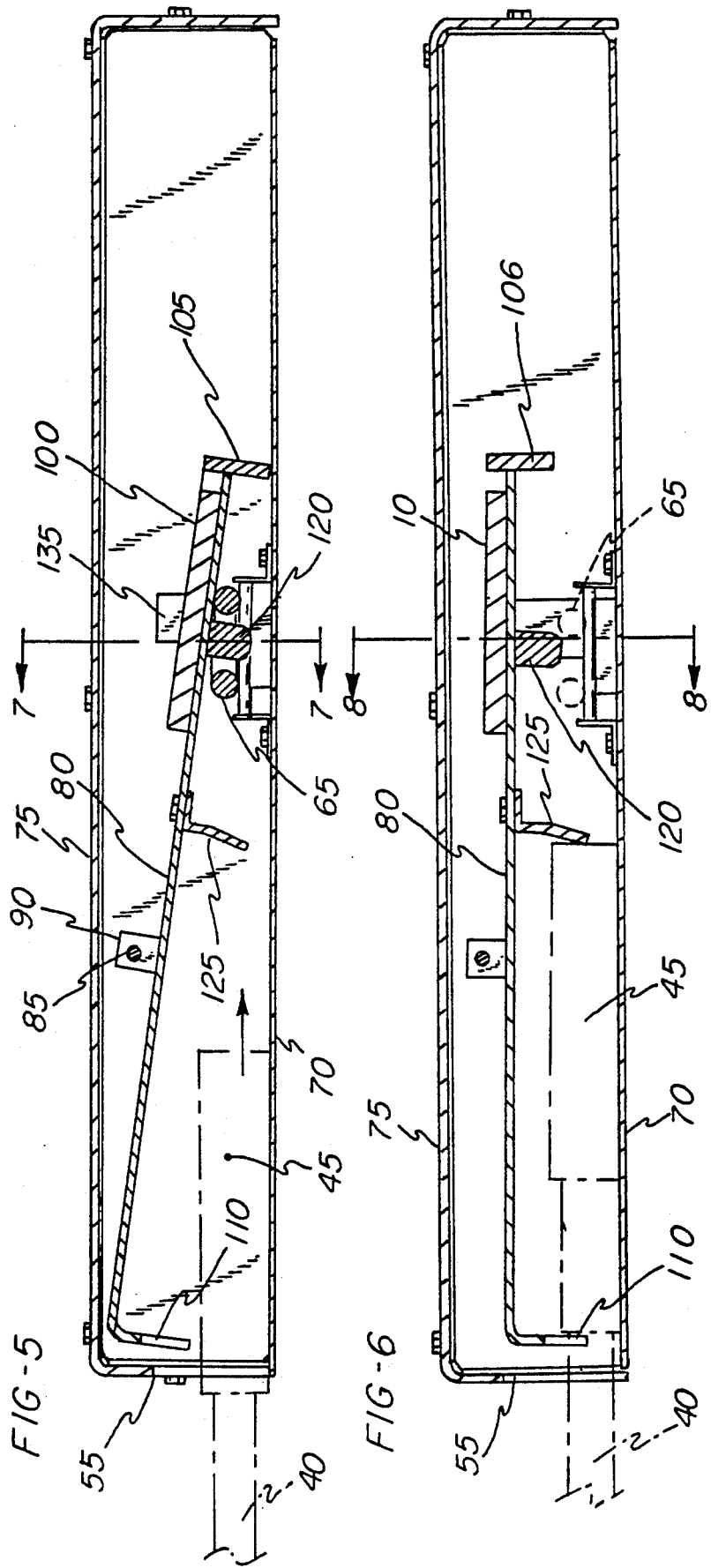

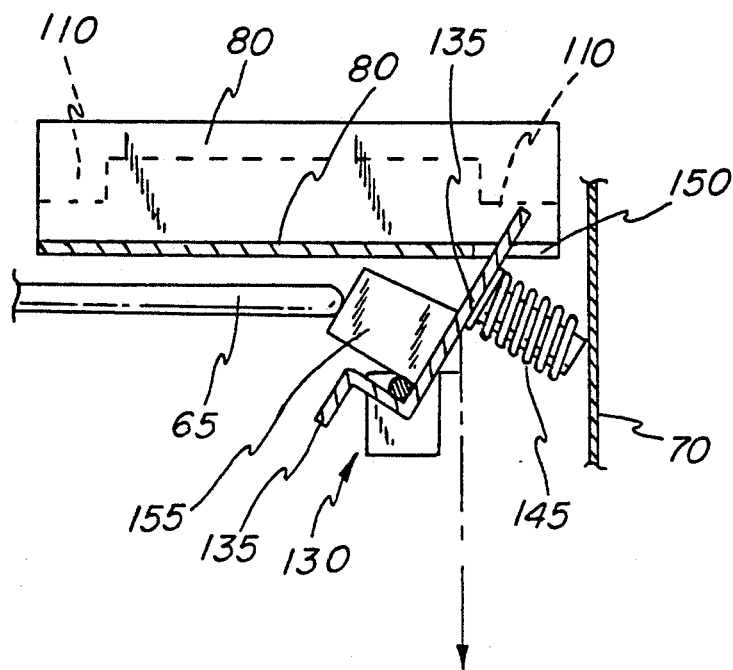
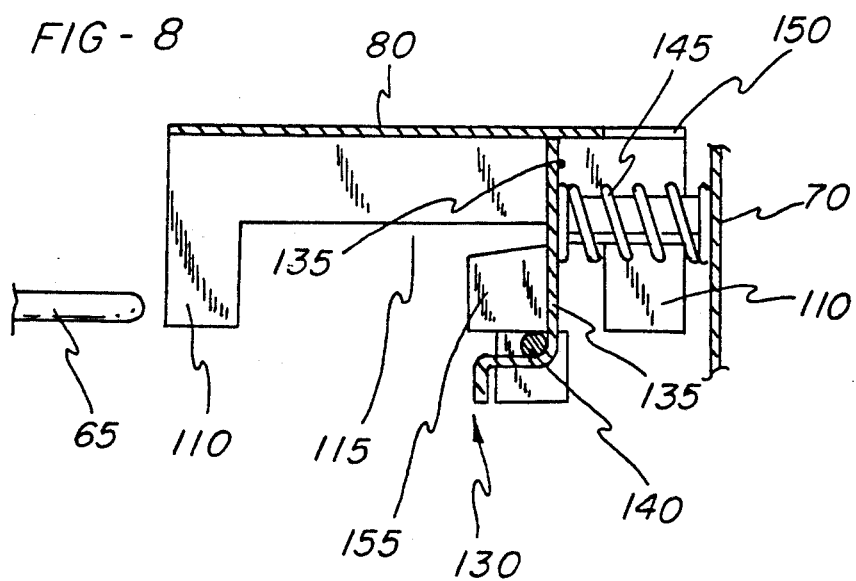

SAFETY INTERLOCK MECHANISM FOR AIRCRAFT GROUND POWER UNITS

BACKGROUND OF THE INVENTION

This invention relates to a safety interlock mechanism to prevent the movement of an aircraft ground power unit while an electrical cable from the ground power unit is attached to an aircraft.

Aircraft sitting at a gate or terminal will normally shut down their engines along with any internal or auxiliary power generating equipment, especially if they intend to remain at the terminal for any significant length of time, and will instead use the electrical power supplied by a portable ground power unit carried on a wheeled trailer.

The ground power unit is towed into position by a tractor or tug, and once in place, the unit is uncoupled from the tractor and its electrical cable is connected to the aircraft by plugging the cable into a receptacle provided on the aircraft. Once it has served its purpose, and auxiliary power is no longer needed from the ground power unit, the electrical cable is removed, and tongue of the trailer of the ground power unit is reattached to a tractor and the unit removed from the vicinity of the aircraft. If the unit is moved while the electrical cable is attached to the aircraft, the aircraft itself may be damaged along with the cable, the receptacle and the generator. Damage from these so-called "pull away" incidents can be avoided if some means could be provided to prevent the tow bar from being attached to the tractor or tug while the electrical cable remains attached to the aircraft.

SUMMARY OF THE INVENTION

In the present invention, a safety interlock mechanism is provided that requires the trailer tow bar be raised and placed into the mechanism before the electrical power supply cable can be removed from the mechanism and attached to the aircraft. Similarly, the electrical cable must be disconnected from the aircraft and placed into the interlock mechanism before the tow bar can be removed and attached to a tractor for movement of the ground power unit.

The safety interlock mechanism of the present invention is a structure attached to the front portion of the ground power unit or trailer. A U-bolt is attached to the tow bar so as to activate the locking mechanism within the interlock mechanism when the tow bar is in its upright position. The interlock mechanism includes a receptacle for the electrical cable which also activates the locking mechanism when the cable is installed.

Simply stated, the interlock mechanism includes a hinged lever or plate. When in one position, this plate prevents the removal of the electrical cable connector when the tow bar is not in place, and similarly, it prevents the lowering of the tow bar when the electrical cable connector has been removed.

It is therefore an object of this invention to provide a safety interlock mechanism that prevents a tow bar on a ground power unit from being lowered into an operating position unless the electrical cable has been removed from an aircraft.

It is a further object of this invention to provide a safety interlock mechanism on a ground power unit for preventing the installation of an electrical cable to an aircraft unless the tow bar has been removed from the tractor and is placed in an upright position in the mechanism.

It is another object of the invention to provide, in a ground power unit for providing electrical power to an aircraft comprising a wheeled chassis, a motor-generator carried on the chassis, a towing arm attached to the chassis which is movable from an upper position to a lower position where it can be attached to a motor vehicle for movement from one location to another, and an electrical cable having one end connected to the motor-generator and having a plug at the other end for connection to a mating connector on an aircraft, the improvement comprising a tow bar catch mounted on the towing arm, a box mounted on the chassis having an opening positioned to receive the tow bar catch and a receptacle for receiving the plug end of the electrical cable, and an interlock mechanism within the box for preventing both the tow bar catch and the plug from being removed from the box at the same time, the mechanism including means for preventing the plug from being removed from the box when the tow bar catch is not fully in the opening, and means for preventing the tow bar catch from being removed from the box when the plug is not fully in the receptacle.

Other objects and advantages of the invention will be apparent from the following description, the accompanying drawings and the appended claims.

BRIEF DESCRIPTION OF THE DRAWINGS

FIG. 3 is a top plan view with a portion of the hinged locking plate broken away to show the tow bar mounted U-bolt engaging a hinged plate release latch mechanism;

FIG. 4 is a top plan view with a portion of the hinged plate broken away to show a tow bar mounted U-bolt withdrawn from the safety interlock mechanism and the release latch mechanism under the hinged plate;

FIG. 5 is a cross sectional elevational view of the invention taken along lines 5—5 of FIG. 3 showing the position of the hinged plate when the electrical cable is removed;

FIG. 6 is a cross sectional elevational view of the invention taken along lines 6—6 of FIG. 4 showing the position of the hinged locking plate when the electrical cable is installed;

FIG. 7 is a side cross sectional elevational view taken along lines 7—7 of FIG. 5 showing the release latch mechanism with the tow bar U-bolt moving the latch away from the hinged plate; and FIG. 8 is a side cross sectional elevational view taken along lines 8—8 of FIG. 6 with the U-bolt withdrawn showing the release latch mechanism positioned under the hinged locking plate to prevent its rotation.

DESCRIPTION OF THE PREFERRED EMBODIMENT

Figure 1:
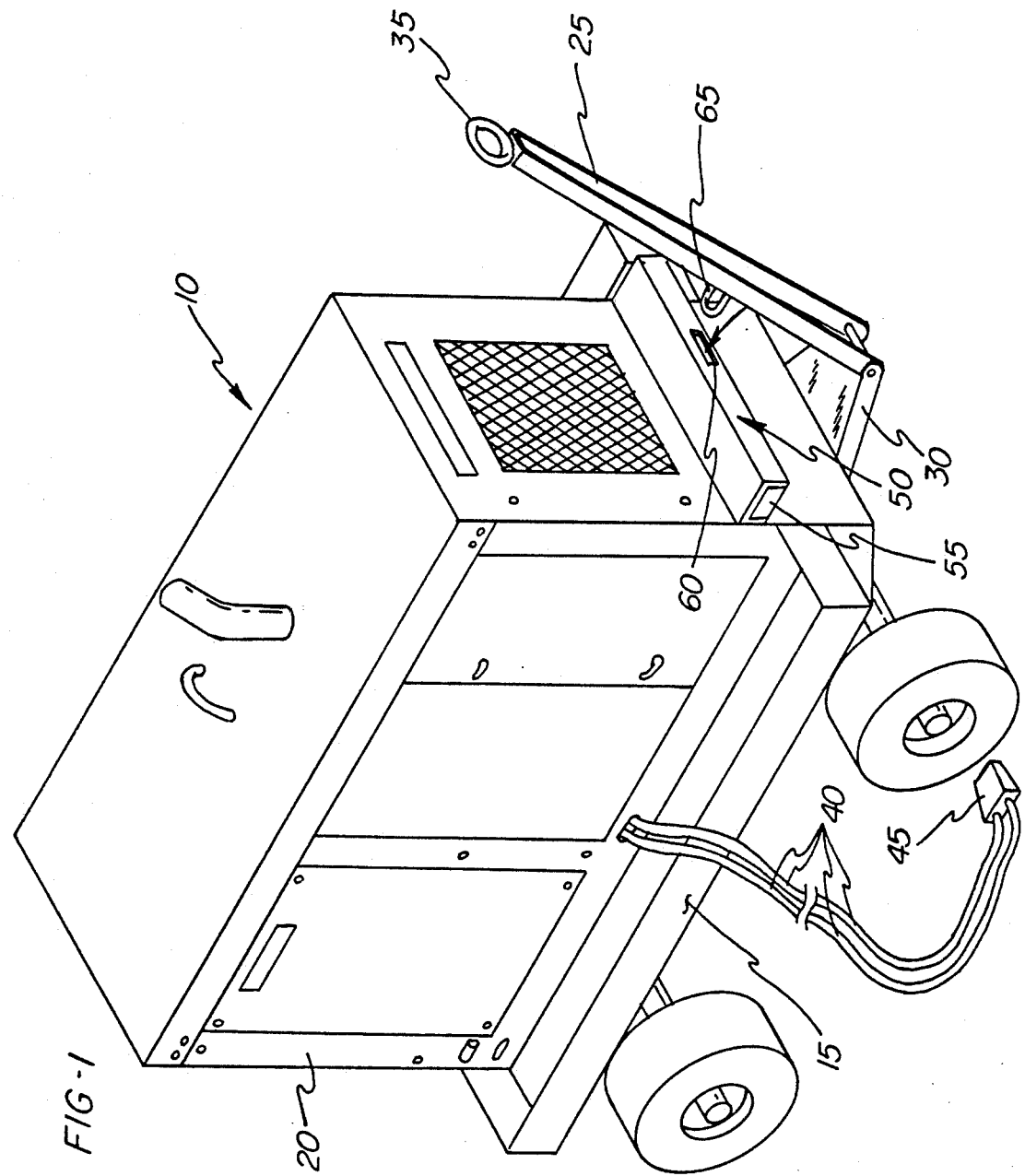
FIG. 1 is a perspective view of a ground power unit incorporating the safety interlock mechanism of this invention.

Reference is now made to the drawings which illustrate a preferred embodiment of this invention. In FIG. 1, a ground power unit of the type for supplying electrical power to an aircraft is shown generally at 10. This ground power unit is representative of the various types of ground power units that are used on airports, and each typically includes a wheeled chassis 15 on which an engine driven motor-generator 20 is mounted.

The ground power unit includes a tow bar 25 attached to the chassis at 30. A ring 35 at the outer end of the tow bar may be attached to a tractor (not shown). The tow bar 25 is movable from an upper position to a lower position where it can be attached to the tractor for movement from one location to another.

An electrical cable 40 extends from the motor generator 20 and is provided with a plug or connector 45 at its outer end for coupling with a mating connector on an aircraft. When not connected to an aircraft, the electrical connector 45 must be installed in a safety interlock mechanism 50.

The safety interlock mechanism 50 is attached to the front of the ground power unit and is provided with a first opening or receptacle 55 at one end for receiving the electrical connector 45 and a second opening 60 at its front for receiving an extension or catch 65 attached to the tow bar. As shown in FIG. 5, the tow bar catch 65 is simply a U-bolt mounted to the tow bar 25 by conventional means.

The safety interlock mechanism 50 includes a U-shaped housing 70 provided with a C-shaped cover 75. The first opening 55 is formed in one end of the cover to admit the electrical connector 45 and associated cable 40. The second opening 60 is formed in the front of the housing 70. A hinged plate 80 is supported within the housing by a hinge pin 85 extending through tabs 90 formed from cut-outs in the plate 80. Spacers 95 position the plate centrally within the housing 70.

The plate 80 is biased to rotate to the right, as shown in FIG. 5, by means of a pair of weights 100 and 105 for reasons which will be explained. Alternatively, springs or other conventional biasing means could be employed to cause the right side of the plate to tend to move downwardly, as viewed.

Figure 2:
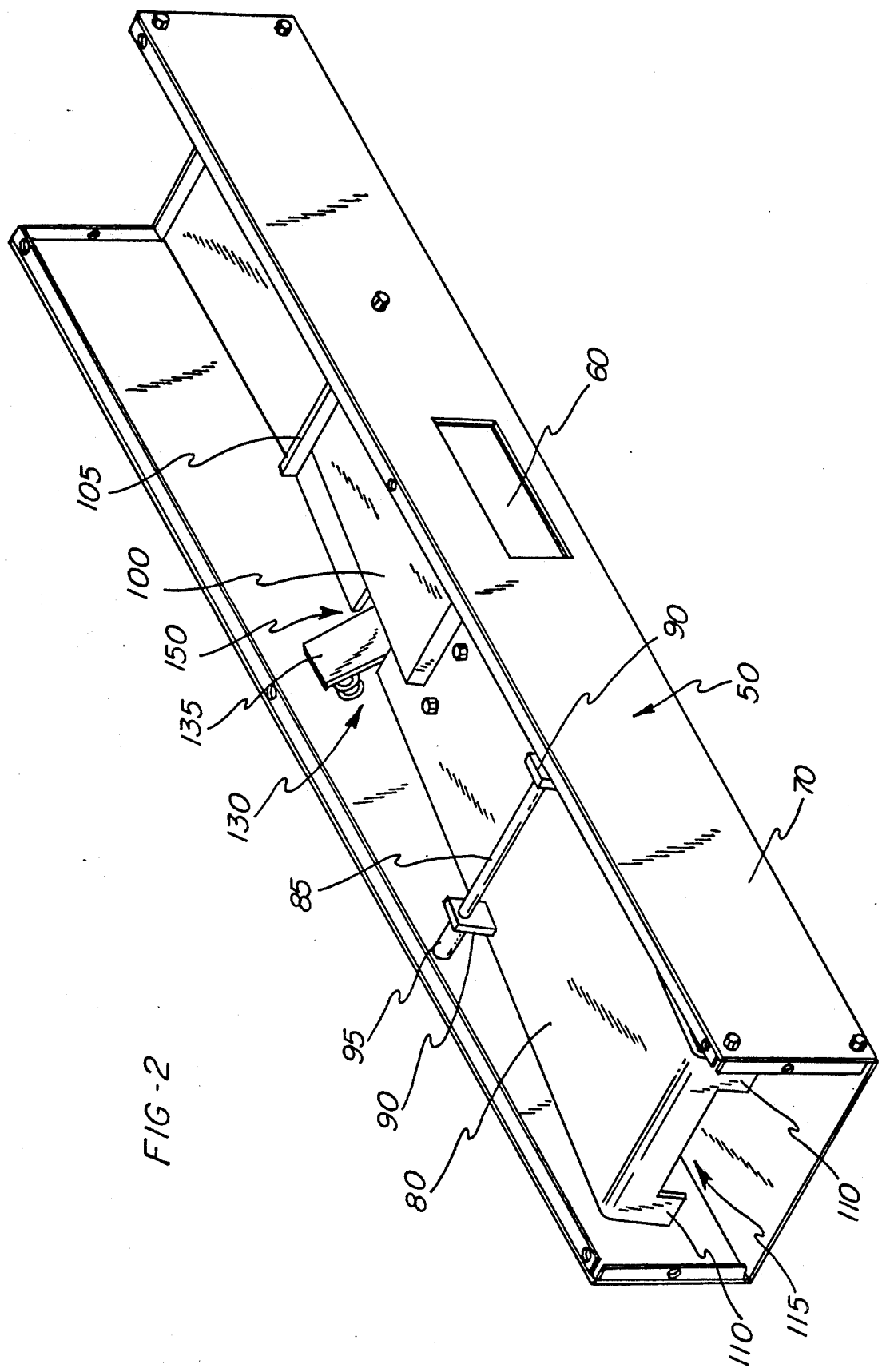
FIG. 2 is a perspective view of the safety interlock mechanism with the top cover removed to show a hinged plate for locking an electrical cable connector or a tow bar in place.

The plate 80 is provided with a pair of restraining or locking tabs 110 its left end, as viewed in FIG. 2, for engaging the back side of the electrical connector 45 when the plate is rotated to the left, or as shown in FIG. 6. An opening 115 between the tabs 110 provides a clear passage for the electrical cable 40.

The plate 80 includes a locking pin 120 for preventing the U-bolt 65 from being removed from the opening whenever the plate 80 is rotated to the position shown in FIGS. 2 and 5.

A trip arm 125 is secured to the underneath side of the hinged plate 80, as shown in FIGS. 5 and 6. This arm will rotate the hinged plate to the left or counterclockwise, as viewed in the drawings, whenever the electrical connector is fully inserted into the mechanism, as illustrated in FIG. 6.

A latch mechanism 130, shown in more detail in FIGS. 7 and 8, is provided to prevent the hinged plate 80 from rotating to the right, as viewed, unless the U-bolt 65 is fully inserted into the opening 60. The latch mechanism 130 includes an L-shaped member 135 hinged at 140 and biased to the left, as viewed in FIG. 8, by spring 145 placed between the member 135 and the wall of the housing 70. The top of the member 135 will rest underneath the plate 80. A small cut-out 150 in the hinged plate 80 provides a relief between the edge of the plate and the wall of housing 70. An extension member 155 extends outwardly from the member 135 and is positioned to engage the U-bolt 65 (FIG. 7) whenever the U-bolt is fully inserted into the opening 60.

As disclosed, the safety interlock mechanism 50 of the present invention will prevent both the tow bar catch 65 and the electrical connector 45 from being removed from the box 70 at the same time. To explain the operation of the safety interlock mechanism 50, it will first be assumed that both the tow bar catch 65 and the electrical connector 45 have been inserted into the box 70.

With the electrical connector 45 in its fully installed position; the hinged plate 80 will be rotated counterclockwise by action of the trip arm 125. The tow bar catch or U-bolt 65 will be engaging the latch mechanism 130 and the member 135 will be clear of the plate 80. The plate 80 will be in the position shown in FIG. 6. Either, but not both, the connector or the tow bar may be removed from the box at this time.

Assuming first that it is desired to remove the electrical connector 45, it is required that the tow bar catch 65 be fully inserted. As the connector 45 is moved to the left, as viewed in FIG. 6, the plate 80 will begin to rotate to the right or clockwise as pressure is removed from the trip arm 125. The plate is free to rotate under the weight of the counterweights 100 and 105 since the latch member 135 has been moved clear of the plate by the tow bar catch 65. When the plate 80 has fully rotated, the locking tabs 110 will be raised sufficiently to permit the removal of the connector 45 from the box 70. In the meantime, rotation of the plate 80 has caused the locking pin 120 to move into the center of the U-bolt 65, and it is now prevented from being withdrawn from the box 70.

On the other hand, assuming it was desired first to lower the tow bar 25 and thus remove the tow bar catch 65 from the box 70, its movement will cause the latch member 135 to move under the plate 80, thus maintaining the plate 80 in a level position by preventing its rotation, as shown in FIG. 6. Any attempt thereafter to remove the electrical connector would not be successful since the plate 80 is prevented from rotating and the locking tabs 110 will block the removal of the electrical connector 45.

Thus, the safety interlock mechanism 50 of the present invention requires the electrical connector 45 be removed from the aircraft and properly installed in the box 70 before the tow bar 25 can be lowered and attached to a tractor and the ground power unit 10 moved to a different location. Similarly, the tow bar must be in its fully upright position with the catch 65 fully inserted before the electrical connector 45 can be removed from the box 70.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a ground power unit for providing electrical power to an aircraft comprising
 a wheeled chassis,
 a motor-generator carried on said chassis,
 a towing arm attached to said chassis which is movable from an upper position to a lower position where it can be attached to a motor vehicle for movement from one location to another, and
 an electrical cable having one end connected to said motor-generator and having a plug at the other end for connection to a mating connector on an aircraft, the improvement comprising a tow bar catch mounted on said towing arm, a box mounted on said chassis having an opening positioned to receive said tow bar catch and a receptacle for receiving the plug end of said electrical cable, and an interlock mechanism within said box for preventing both said tow bar catch and said plug from being removed from said box at the same time, said mechanism including means for preventing said plug from being removed from said box when said tow bar catch is not fully in said opening, and means for preventing said tow bar catch from being removed from said box when said plug is not fully in said receptacle.

2. A safety interlock mechanism for use on a ground power unit of the type providing electrical power to an aircraft by means of an electrical cable having an electrical plug at one end thereof, the power unit being carried by a trailer having a tow bar for attachment to a motor vehicle for moving the trailer for one location to another, said mechanism comprising a tow bar catch mounted on said towing arm, a box mounted on the trailer, said box having an opening positioned to receive said tow bar catch and a receptacle for receiving said electrical plug, a hinged plate mounted in said box and having tabs at one end for engaging and preventing said electrical plug from being removed from said box when said tow bar catch is not fully in said box, and a locking pin for engaging said tow bar catch when said electrical plug is not fully in said receptacle, means for biasing said hinged plate to move said locking pin into position to prevent removal of said tow bar catch when said electrical plug is not fully in said receptacle, a trip arm for moving said locking pin out of engagement with said tow bar catch upon insertion of said electrical plug fully into said receptacle, and a latch mechanism for preventing said hinged plate from moving clear of said electrical plug when said tow bar catch is not fully in said box, whereby either the electrical cable or the tow bar catch may be removed from said box, but not both at the same time.

3. The safety interlock mechanism of claim 2 wherein said means for biasing said hinged plate includes weights for urging said locking pin carried by the hinged plate into engagement with the tow bar catch.

* * * * *